United States Patent [19]

Ma

[11] Patent Number: 5,430,875
[45] Date of Patent: Jul. 4, 1995

[54] PROGRAM NOTIFICATION AFTER EVENT QUALIFICATION VIA LOGICAL OPERATORS

[75] Inventor: Yin-Shur D. Ma, San Jose, Calif.

[73] Assignee: Kaleida Labs, Inc., Mountain View, Calif.

[21] Appl. No.: 40,485

[22] Filed: Mar. 31, 1993

[51] Int. Cl.⁶ ............................................. G06F 11/30
[52] U.S. Cl. .................................. 395/650; 395/775; 364/DIG. 1; 364/280.8; 364/281.3
[58] Field of Search .................. 395/650, 775; 364/221.7, 280.8, 281.3

[56] References Cited

U.S. PATENT DOCUMENTS 5,237,684  8/1993  Record et al. ........................ 395/650
5,321,837  6/1994  Daniel et al. ........................ 395/650

FOREIGN PATENT DOCUMENTS 0297339  1/1989  European Pat. Off. .
0528222  2/1993  European Pat. Off. .

OTHER PUBLICATIONS

Inside Macintosh, Apple Computer, vol. 1, Chapter 8, The Toolbox Event Manager, pp. I-241 to I-266 (Addison-Wesley, 1985).

Primary Examiner—Kevin A. Kriess
Assistant Examiner—Jonathan Hall Backenstose
Attorney, Agent, or Firm—Irell & Manella

[57] ABSTRACT

The present invention provides a method and apparatus for event handling which addresses the problems associated with the prior art, including those problems discussed above, by delegating, for example to the system software, the task of determining whether particular combinations of events and other conditions have occurred. The present invention provides applications with a mechanism for establishing a template, called an event qualifier network, which monitors the occurrence of an event or specific combination of events, along with virtually any other qualifying condition specified by the application. In response to the occurrence of such events and conditions, the event qualifier network notifies the application that its "desired event" has occurred, whereupon the application may then take the appropriate action. Event qualifier networks can be quickly and simply built to monitor for arbitrarily complex combinations of events. Furthermore, an event qualifier network may monitor for events in combination with other conditions, such as a particular state of the system or application program (e.g., a mouse-down event and the cursor being in a particular location of the screen), and notify the application when the desired events occur while the specified conditions are met. In addition, event qualifier networks may be combined into a single event qualifier network, providing reusability, improved performance and an event qualifier hierarchy.

14 Claims, 7 Drawing Sheets

PROGRAM NOTIFICATION AFTER EVENT QUALIFICATION VIA LOGICAL OPERATORS

CROSS REFERENCES

The present invention is related to copending application Ser. No. 08/041,395, entitled "Synchronized Clocks and Media Players," (Attorney Docket no. 55378.0028), which is incorporated by reference herein.

BACKGROUND

The present invention relates to the field of computer operating systems and general application software, and more particularly to methods and apparatus for controlling the communication of events between an operating system and its application programs.

Computer programs are, in essence, a series of instructions that direct the operation of a computer. In general, a program performs the functions either of an operating system, which controls the interaction of the various components of the computer relatively independent of the use to which the computer is being put, or of an application which is designed to accomplish a specific task or tasks (e.g., word processing, spreadsheet, etc.)

Many operating system programs and virtually all application programs provide for, and in fact require, user interaction with the program. The scheme used to facilitate the user's interaction with the computer is referred to as the user interface.

Popular common user interfaces employ windows, which are discrete regions of the screen in which elements are displayed, and user interaction with the computer program may occur via scroll bars for scrolling up or down within a window, menus for selecting commands, icons representing applications and documents, etc. In conjunction with a program's user interface, hardware devices are provided for interaction with the programs. Examples of such hardware devices include a keyboard, a mouse, a disk drive, a network interface card, etc. The Macintosh line of computers from Apple Computer Inc. of Cupertino, Calif., operate with such a user interface and with such hardware.

Many modern application programs operate by looping repeatedly through the program, periodically polling the operating system software for an indication that at least one "event" has occurred. Events generally represent user activity via one or more of the hardware devices, but can also represent actions generated independently by external hardware devices, as well as internal "messages" sent by a system or application program.

When the application learns (by polling the system) that an event has occurred, the application must determine whether the event is of a type in which it is "interested" (i.e., an event in response to which the application program desires to perform some action), and if so, what action needs to be taken in response to that event. Since the application will not do anything until an event is encountered, this type of application is referred to as "event driven."

Examples of user-generated events include: typing on a keyboard (also referred to as "key-down" and "key-up" events), depressing a button on a mouse (also referred to as "mouse-down" and "mouse-up" events), and inserting a disk in a disk drive. Events may also be generated indepedently by a hardware device (e.g., a signal from a network interface card indicating that a block of data has arrived over the network), as well as by an application or operating system program (e.g., a message indicating a particular state of the program, such as the completion of a spreadsheet calculation).

These events are typically handled, one at a time, by the application. In certain circumstances, applications are interested in a combination of events. For example, an application may desire to close a window if the user simultaneously depresses the "option" key and the mouse button (within that window). In this case, in deciding what action to take in response to the events generated by depressing these keys, the application program must determine if the key depressions occurred simultaneously.

In the Apple Macintosh, events are posted to an event queue, where they are metered out, one at a time, to the application by an Event Manager. Generally, events are retrieved by the application in a first-in-first-out order. However, some events may have a higher priority than other events, and in addition, an application may ask for certain events before others.

The precise manner by which events are generated, captured, and communicated to an application program varies from system to system, and is beyond the scope of this discussion. For a more detailed discussion of events and event handling, see INSIDE MACINTOSH, Apple Computer, Vol. 1, pp. 1-243 to 1-266, and other sections thereof (Addison-Wesley, 1985), incorporated herein by reference.

Event handling as presently practiced in the art presents a number of problems and disadvantages to which the present invention is addressed. One problem that arises in event handling, especially where combinations of events are involved, is that a significant amount of application program code is required to check for events, the order in which they occur, the proximity in time to other events, and the state of other system and application resources in which the application is interested. Likewise, the complexity of the application program code increases dramatically as the application is required to monitor for increasingly complex combinations of events and other conditions. The process of checking for the occurrence of these events and conditions requires not only a significant amount of application code, but also a significant amount of application processing time.

Another problem occurs when an application programmer seeks to provide a user with the ability to change the event or combination of events or other conditions which will trigger a certain action by the application program. For example, while an application may open a new window in response to the combination of certain key-down and mouse-down events which occur while the cursor is in a particular region of the screen, it may be desirable to provide the user with the ability to change the specific events or other conditions which trigger the opening of a new window—e.g., the single key-down event caused by depressing a dedicated "function" key. Allowing changes such as these generally requires either recompiling or "patching" the program, and only exacerbates the problems of code volume, complexity, and processing time. In general it is desirable to simplify the process of writing event driven applications, and as described below this forms the basis for the present invention.

SUMMARY OF THE INVENTION

The present invention provides a method and apparatus for event handling which addresses the problems associated with the prior art, including those problems discussed above, by delegating, for example to the system software, the task of determining whether particular combinations of events and other conditions have occurred. The present invention provides applications with a mechanism for establishing a template, called an event qualifier network, which monitors the occurrence of an event or specific combination of events, along with virtually any other qualifying condition specified by the application. In response to the occurrence of such events and conditions, the event qualifier network notifies the application that its "desired event" has occurred, whereupon the application may then take the appropriate action.

Event qualifier networks can be quickly and simply built to monitor for arbitrarily complex combinations of events. Furthermore, an event qualifier network may monitor for events in combination with other conditions, such as a particular state of the system or application program (e.g., a mouse-down event and the cursor being in a particular location of the screen), and notify the application when the desired events occur while the specified conditions are met. In addition, event qualifier networks may be combined into a single event qualifier network, providing reusability, improved performance and an event qualifier hierarchy.

BRIEF DESCRIPTION OF THE DRAWINGS

The present invention will be described in greater detail below, including specific examples thereof, with regard to the figures, in which.

As between each of these figures, like reference numerals shall denote like elements.

DETAILED DESCRIPTION

For purposes of illustration, the present invention will be described by way of selected examples (or applications), with reference to a number of embodiments of the present invention where appropriate. It will be apparent to one skilled in the art that the examples, and the environment in which they are developed, demonstrate the functionality and features of the present invention. It will also be apparent to one skilled in the art that certain variations, additions, deletions, modifications, etc., to the examples are contemplated, and that recitation of these examples does not limit the scope of the invention.

Figure 1:
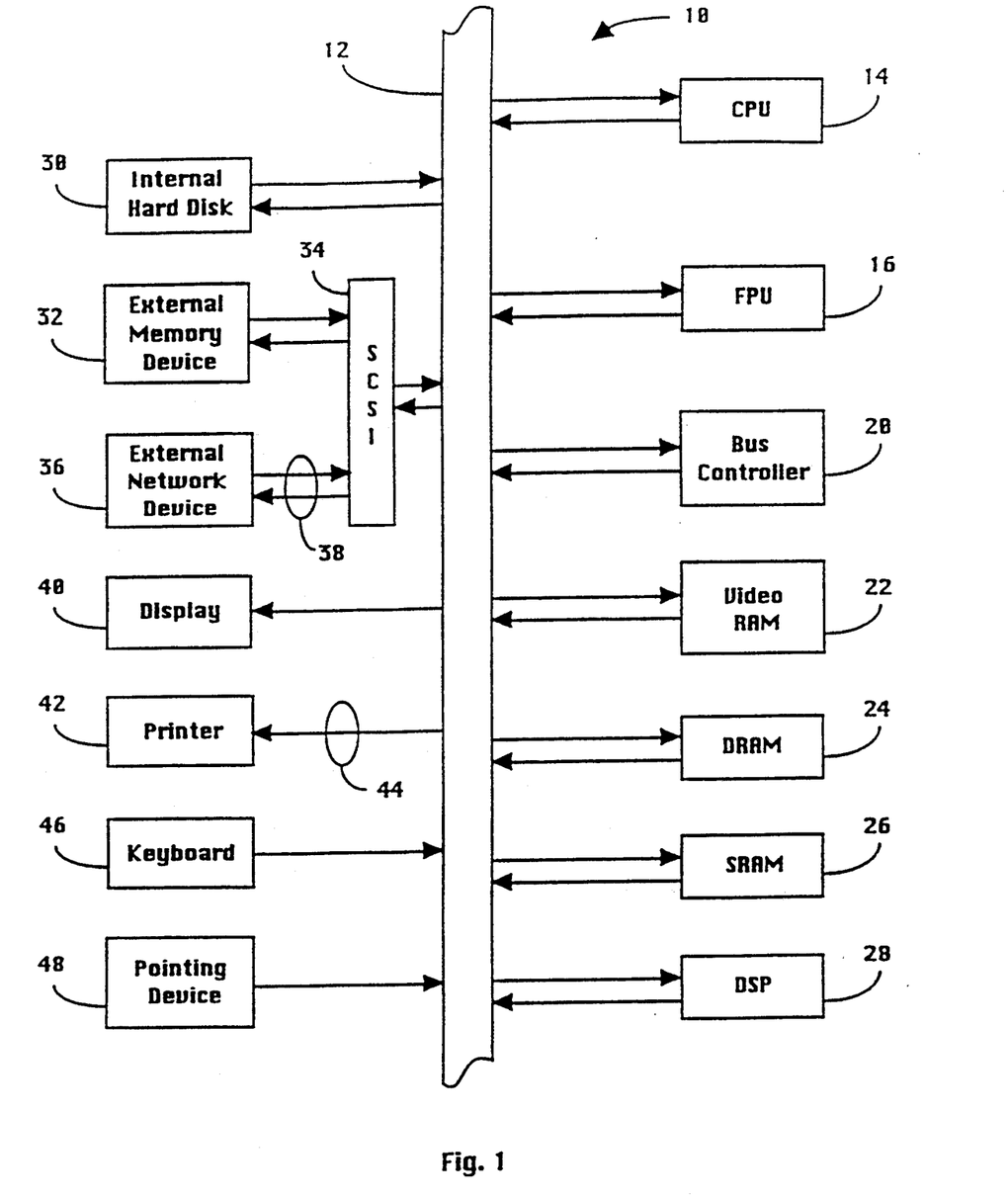
FIG. 1 is an illustration of the general architecture of a computer system within which the present invention may operate.

With regard to FIG. 1, there is shown therein the general architecture of a system 10 of the type within which the present invention operates. System 10 comprises a main bus 12, which serves to interconnect various components, including at least some of the following (and possibly other additional components): Central Processing Unit (CPU) 14, Floating Point Unit (FPU) 16, Bus Controller 20, Video RAM 22, Dynamic RAM (DRAM) 24, Static RAM (SRAM) 26, Digital Signal Processor (DSP) 28, Internal Hard Disk 30, External Memory Device 32 (connected for example via a SCSI port 34), External Network Devices 36 (communicating for example over an Ethernet Network 38, and connected via SCSI port 34), Display Device 40 (such as a CRT), Printer 42 (such as a PostScript device connected for example via a serial port 44), Keyboard 46, and Pointing Device 48 (such as a mouse, trackball, etc.) The interconnection and functioning of each of these components in an operating computer system are well known in the art. However, the function and significance of particular components will be discussed in further detail where appropriate.

While the discussion that follows describes the invention in terms of the software programming environment known commonly as object oriented software design, it will be appreciated that the functionality of the present invention is not limited to such environments. However, as support for one possible environment in which the present invention operates, a description of certain relevant details of object oriented programming environments is presented.

In an object oriented programming language, the fundamental data structures of the language are objects, programming elements that contain a specification of both data and actions. Data are specified in local variables, referred to as instance variables, contained within the object. Actions, or methods, are subprograms that operate on the variables. Methods are invoked by messages sent from one object to itself or other objects.

There are two fundamental object constructs: classes and instances. Classes define a set of variables and methods and can be thought of as templates for object types. Instances (or objects) are particular run-time instantiations of a class. An object provides storage for variables defined in its class. Each instance has its own version of those variables. When a message is sent to an object, the object looks to methods defined in its class to determine how the message is to be executed.

Classes are defined in terms of a class hierarchy. A class inherits all variables and methods from classes above them in the hierarchy, referred to as superclasses. The inheriting class may be referred to as a subclass or child of the superclass. The variables and methods inherited from a superclass are available to the inheriting class as if they were defined within the inheriting class. Note that if a subclass has multiple superclasses, all the variables and methods from each superclass are inherited. This is often referred to as multiple inheritance.

There are two types of variables that may be defined within a class. The first are class variables, whose storage is shared by all instances of the defining class. Class variables are typically used for coordination between classes and instances. The second are instance variables, which are variables specific to each particular instance. That is, separate storage space is allocated for each instance variable of each instance.

Methods specify the action to be performed when a message is sent to an object. When the message is sent to an object, the message name is matched against method names defined for that object. The method actually executed is the method with the same name as the message that is defined lowest in that object's class hierarchy.

Messages can have parameters. When a message is sent, all actual parameters are fully evaluated before a method is located for that message. Methods have formal parameters, corresponding to the actual parameters in the message, and temporary variables. Temporary variables may be created when a message is executed, and are available only with the scope of that method while the method is executing.

Programs perform by sending messages to objects which invoke a method in an object's class or class hierarchy. Often, methods send messages to other objects, invoking other methods. Typically, each method returns a result to the sender. At the heart of many languages, and especially an object oriented language, is a program segment for interpreting and evaluating messages and keeping track of where to return when methods call other methods.

Object oriented programming environments can be implemented with many programming languages. One common example of an object oriented environment is the C++ environment, described in further detail in Ellis. Margaret and Bjarne Stroustrup, THE ANNOTATED C++ REFERENCE MANUAL (Addison-Wesley 1990) and Coplien, James O., ADVANCED C++ PROGRAMMING STYLES AND IDIOMS (Addison-Wesley 1992).

According to one embodiment of the present invention, a plurality of objects, referred to herein as qualifiers, are interconnected to form a network, referred to herein as an event qualifier network. Each event qualifier is an instance of one of a variety of event qualifier classes. Examples of such classes include KeyQualifier class, MouseQualifier class, RegionQualifier class, Button-Qualifier class, LogicQualifier class, StateCheck class. etc., described in further detail below.

In general, an event qualifier "qualifies" a specific event against a fixed criteria. That is, it represents a test for an occurrence of an event. According to one embodiment, an event qualifier causes an event manager or other event handling mechanism to be polled to determine whether a specified event has occurred. In another embodiment, the event qualifier registers an interest with the event manager, and is thereby alerted upon the occurrence of the event. If the specified event occurs, an action is invoked, principally by way of the event manager calling a function. The action could be a callback function, a message, etc., and is discussed in more detail below.

Similarly, a state check qualifier "qualifies" a state of some aspect of the system against a specified state. That is, it represents a test to determine whether a specified aspect of the system is in a desired state—i.e., whether the specified condition is met. Examples of state include time, values of variables, attributes of display objects such as size, color, position, etc. State check qualifiers generally do not check or register with the event manager, but return in a specific fashion an answer to the question: Is the aspect of the system in a specified state. If the state check qualifier returns an indication that the aspect is in the specified state, a function is called, which is described in further detail below.

A logic qualifier "qualifies" a relationship between two other objects. That is, a logic qualifier determines whether a specified logical relationship exists between two objects such as event qualifiers, state check qualifiers, other logical qualifiers or combinations thereof. Logic qualifiers invoke actions in response to satisfaction of the logical relationship they define (e.g., AND, OR, NOT, etc.), as further described below.

The event qualifier network includes at least one event qualifier and at least one other element such as another event qualifier, a state check qualifier or a logic qualifier. The event qualifier network determines whether the specified events have occurred, whether the specified aspects of the system are in their specified states, and/or whether the specified logical relationships among qualifiers exists. For example, an event qualifier network may determine whether one of two specified events has occurred, whether both of two events have occurred, or whether an event has occurred while an aspect of the system is in a desired state.

Figure 2:
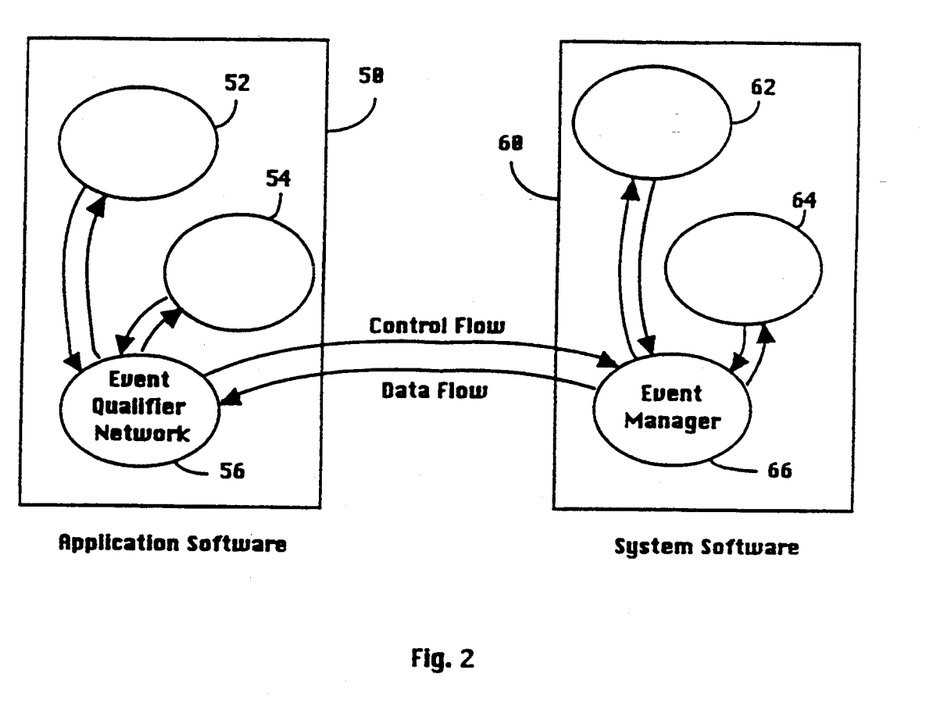
FIG. 2 is an illustration of a particular software environment in which the present invention may operate, showing the control and data flow between an application software program and an operating system software program.

With regard to FIG. 2, there is shown therein application software 50 including an embodiment of the present invention, and comprising a plurality of objects 52, 54, and 56, and system software 60 comprising a plurality of objects 62, 64, and 66. Objects 52 and 54 may be of virtually any type, and application software 50 may include an event qualifier object 56. Likewise, objects 62 and 64 may be of virtually any type, and system software 60 may include an event manager object 66 (or similar mechanism for maintaining, prioritizing, and otherwise handling events). While, for purposes of illustration, event qualifier object 56 is shown "contained" within application software 50, it will be appreciated that it is not a physical part of the application, but rather associated with the application, as will be apparent from the following discussion. Objects 52 and 54 of application software 50 may rely on the event qualifier network object 56 for notification of the occurrence of an event or combination of events, and objects 62 and 64 may produce the events that the event qualifier network 56 is checking for. In general, control will be passed from event qualification network 56 to the event manager 66, and data will be passed from the event manager 66 to the event qualifier network 56.

Figure 3:
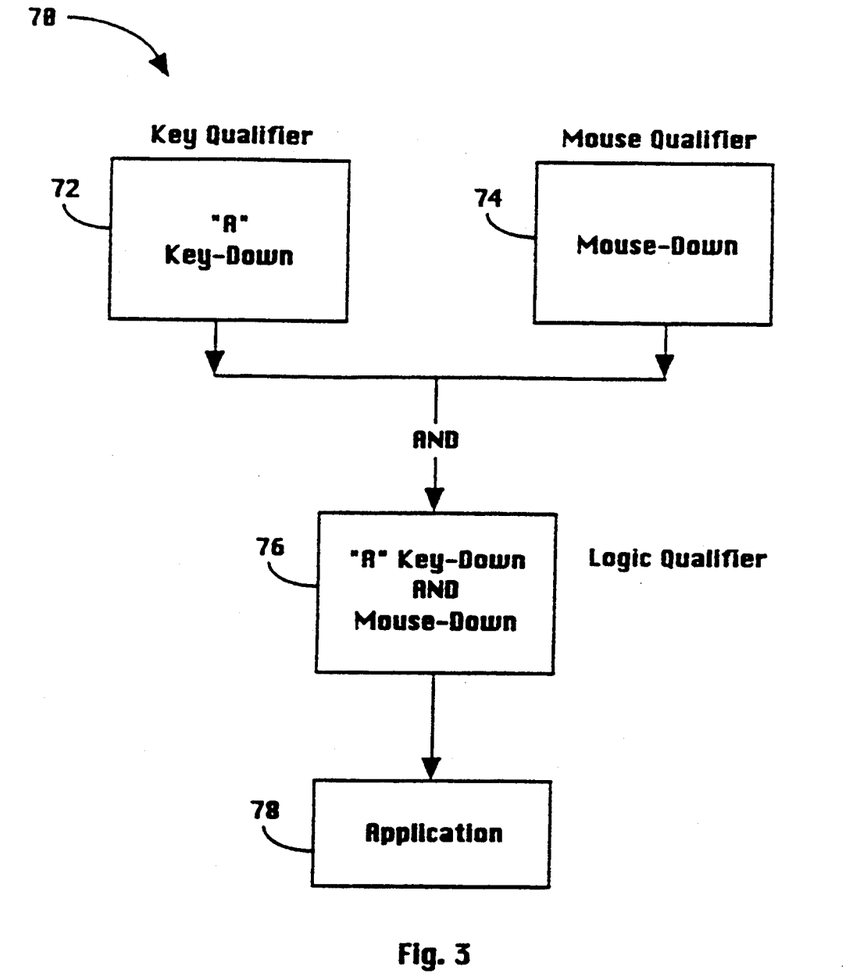
FIG. 3 is an illustration of an event qualification network according to an exemplary embodiment of the present invention.

With regard to FIG. 3, there is shown therein an exemplary event qualification network 70 which shall be referred to in the description of class definitions according to one embodiment of the present invention. Event qualification network 70 is comprised of three event qualifiers. Event qualifier 72 is an instance of the KeyQualifier class, and identifies a function called in response to a key-down event of the letter "A" key. Event qualifier 74 is an instance of the MouseQualifier class, and identifies a function called in response to a mouse-down event. Event qualifier 76 is an instance of the LogicQualifier class, and identifies a function called in response to the "A" key-down event AND the mouse-down event.

In essence, KeyQualifier 72 checks to see whether the key assigned to that instance has been depressed. MouseQualifier 74 checks to see whether the mouse has been depressed while the cursor is in a region of the screen defined for that instance, and LogicQualifier 76 determines whether the defined logical relationship, AND in this case, is satisfied by the instances of KeyQualifier 72 and MouseQualifier 74. That is, in this example event qualifier network 70 tests to see if the letter "A" key and the mouse key have been depressed simultaneously, and if so, calls a certain function identified by LogicQualifier 76.

Definitions of the basic class structures of the qualifiers employed in this example are shown in the following Table 1.

Table 1

1. KeyQualifier
   A. Variable
      i. storage for key definition for key-down
   B. Methods
      i. definition of particular "key" for key-down event
      ii. identification of function (e.g., notification to client) called upon key-down event for particular key
         iii. identification of function (e.g., registering interest with event manager) for determining whether event manager has a key-down event for the particular key
2. MouseQualifier
   A. Variable
      i. storage for region definition for mouse-down
   B. Methods
      i. definition of region of screen in which cursor must be located upon mouse-down event
      ii. identification of function (e.g., notification to client) called upon mouse-down event when cursor is in defined region of screen
      iii. identification of function (e.g., registering interest with event manager) for determining whether event manager has a mouse-down event in defined region
3. LogicQualifier
   A. Variable
      i. storage for qualifier handles
   B. Methods
      i. setting of logical relationship between return of function calls from "connected" event qualifiers (satisfaction of logical relationship results in a LogicQualifier event)
      ii. identification of function called upon LogicQualifier event
      iii. identification of function (e.g., registering interest with event qualifiers) for obtaining return of function calls from connected event qualifiers It will be appreciated that many additional classes of qualifiers may be similarly defined, for specific events, states of aspects of the system (i.e., any condition that can be evaluated to True of False) or logical relationships required by a particular application. For example, event qualifiers may be established to check for network activity, to distinguish among various keys of a mouse, track ball, remote control device, etc.

In building an application, a programmer establishes the event qualification network appropriate for each desired event, event combination or other condition. Alternatively, event qualification networks may be maintained in a library from which the application developer may draw, incorporating the appropriate network(s) into the application. The network may be built according to the syntax of the particular development language in which the application is being developed. For example, the network of FIG. 3 may be built in an application developed in the C++ environment as illustrated in Table 2:

Table 2

KeyQualifier
   kq=new keyQualifier;
   kq→SetKeyto ('A');
MouseQualifier
   mq=new mouseQualifier;
   mq→SetRegion (region);
LogicQualifier
   lq=new logicQualifier;
   lq→SetLogicQualifier (kq, mq, AND, timeimportant);

In the above example, the SetKeyto and SetRegion methods cause an interest to be registered with the event manager. This means that a data structure 80 representing three parameters is passed to the event manager of the type shown in FIG. 4. Data structure 80 includes three fields, the first field being an event qualifier identification field 82, the second being an event type field 84, and the third being a function address field 86. The event qualification identification field 82 identifies which event qualifier is being passed to the event manager. The event qualifier identification may be a numerical value, or other identifier as appropriate. The event type field 84 identifies what event type the event qualifier is "interested in." That is, the event type field 84 identifies the event type for which the event manager should call the function identified in the function address field 86. The available event types will be application-specific, but may include key, mouse, button, etc., events as previously discussed. As mentioned, the function address field 86 identifies the address of a function which the event manager will call upon the occurrence of the event specified in field 84. Calling (invoking) this function may result in action within the application, generation of a new event, or other appropriate action.

Integral to the functioning of the present invention is the processing of data structure 80. In order for an event qualifier to indicate whether a specific event has occurred, some action must occur with regard to the event qualifier when the specific event occurs. Thus, the event manager must register the interest of the event qualifier in the specific event, and must call the function identified in field 86 when the event occurs. This functionality may be built into an event manager, and certain event managers have this capability. If a particular event manager is not capable of such registration and notification, this functionality may be introduced by an intermediate event manager 90, in accordance with the architecture 92 illustrated in FIG. 5. As illustrated in FIG. 5, an event qualification network 94 registers its interest in an event by transmitting the data structure 80 of FIG. 4 to the intermediate event manager 90. The field data of data structure 80 is then added to tables which intermediate event manager 90 maintains with regard to interested event qualifiers. Intermediate event manager 90 then polls event manager 96 to determine the occurrence of events as known in the art. When intermediate event manager 90 detects an event of the type in which a registered event qualifier is interested (that is, of a type specified in the event type field 84 of data structure 80 of FIG. 4), intermediate event manager 90 calls the appropriate function (i.e., the function at the address identified in field 86 of data structure 80).

The architecture of FIG. 5 allows the event qualification network of the present invention to operate in conjunction with event managers of the type commonly provided in certain computer system environments, such as single-task processing environments. For example, in the system environment of the Apple Macintosh line of computers, the intermediate event manager may loop, repeatedly calling WaitNextEvent to retrieve the available event. A CASE statement may then be used to take action based on the event type. Alternatively, it may be desirable to examine the pending event while leaving it available for subsequent retrieval by Wait-NextEvent. This may be accomplished by the EventAvail function. An exemplary intermediate event manager routine is shown in table 3.

Table 3

```
{
    KPoint               pt, lastpt;
    KEventRecord         event;
    char                 theChar;
    usesClass(CAppl);
    usesClass(CMouseServer);
    initServerManager();
    initEventManager();
    new(CAppl);
    for (;;)
    {
        if (K_WaitNextEvent(KeveryEvent, &event, 0,0))
        {
            switch (event.what)
            {
            case 1:      /* mouse down */
                lastpt.h = 0; lastpt.v = 0;
                while (K_WaitMouseUp())
                {
                    K_GetMouse(&pt);
                    if ((pt.v != lastpt.v) | | (pt.h ! = lastpt.h))
                    {    lastpt=pt;
                         mouse_task (pt, (long)1);}
                }
                K_GetMouse(&pt);
                mouse_task(pt, (long)0);
                lastpt = pt;
                break;
            case 2:      /* key down */
            case 3:
                theChar = event.message & Oxff;
                KeyTask(theChar);
                break;
            default:
                K_GetMouse(&pt);
                if ((pt.v ! = lastpt.v) | | (pt.h ! = lastpt.h))
                {    mouse_task(pt, (long)0);
                     lastpt = pt;}
                if (!pt.h && !pt.v)
                return;
            }
        }
    }
}
```

Alternatively, the event manager 96 may notify the intermediate event manager 90 of the need to be polled. In such a case, intermediate event manager 90 may simply be required to handle the registering of an event qualifier's interest in a specific event, as opposed to polling the event manager. This will be the case in certain multi-task processing environments, such as UNIX. In this type of environment, the above exemplary intermediate event manager of Table 3 may be employed, modified by removal of the looping portion thereof, such as the first "if" statement. In another embodiment of the present invention, the event manager is written specifically with the event qualification network in mind, and thus directly accepts the registration of event qualifiers without the need for an intermediate event manager.

It will be appreciated that the intermediate event manager serves a second, important purpose. In many cases it is desirable to provide the ability to "port" application software written for one computer operating system to a second computer operating system. In so doing, certain portions of the code of the application software must be rewritten in the syntax of the second computer operating system. While the event qualifier network may be a complex body of code which may be operating system dependent, as illustrated above, the intermediate event qualifier is generally not an overly complex structure. Thus, the intermediate event manager may itself be rewritten to act as an interface, allowing the event qualification network to operate in the second computer operating system environment. This simplifies the porting process, and improves the reliability of a ported application.

Figure 4:
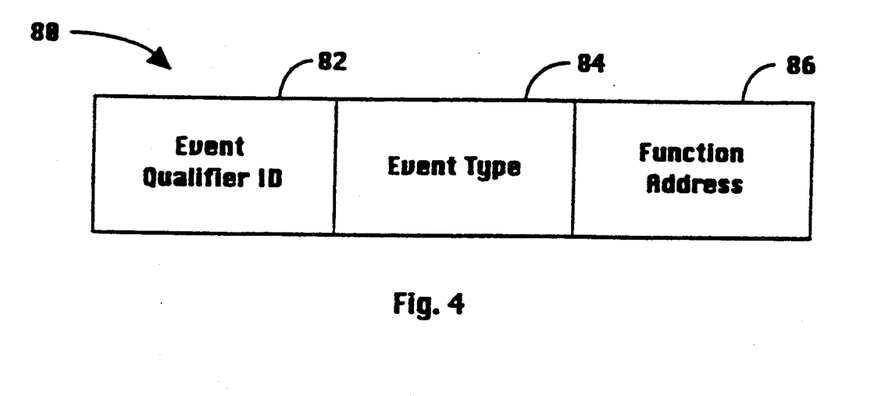
FIG. 4 is an illustration of a data structure passed to an event manager for the purpose of registering an event qualifier with the event manager.
Figure 5:
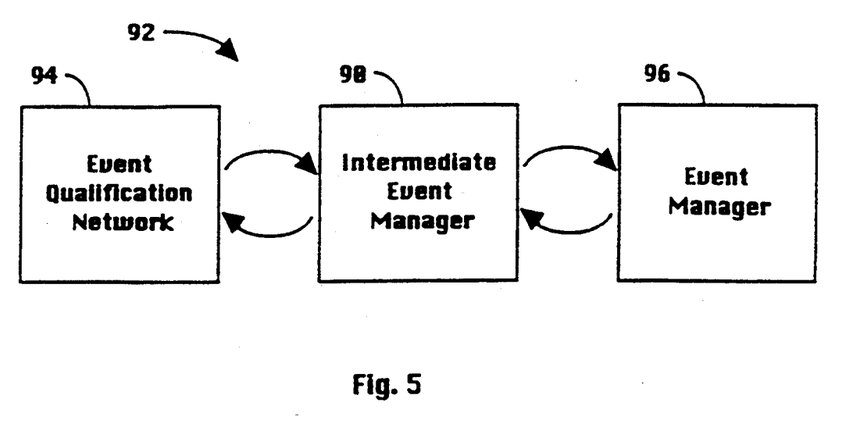
FIG. 5 is an illustration of a portion of a computer software architecture showing an intermediate event manager interposed between an event qualification network and a system event manager.

Upon the occurrence of the specified event, the event manager (or intermediate event manager) calls a function at the address specified in field 86 of data structure 80 (FIG. 4). Typically, this function will determine whether the event which occurred is of the type in which the event qualifier is interested. For example, an event manager may call an event qualifier's function when a key-down event occurs. The function will then determine whether the key associated with that key-down event was the key in which it was interested, such as the "A" key. In order for the function to make this determination, it requires certain data from the event manager, which is illustrated by event record 100 of FIG. 6. Event record 100 comprises five fields, a What field 102, a Message field 104, a When field 106, a Where field 108, and a More field 110. The individual structures of these fields are specified in Table 4.

Table 4

Figure 6:
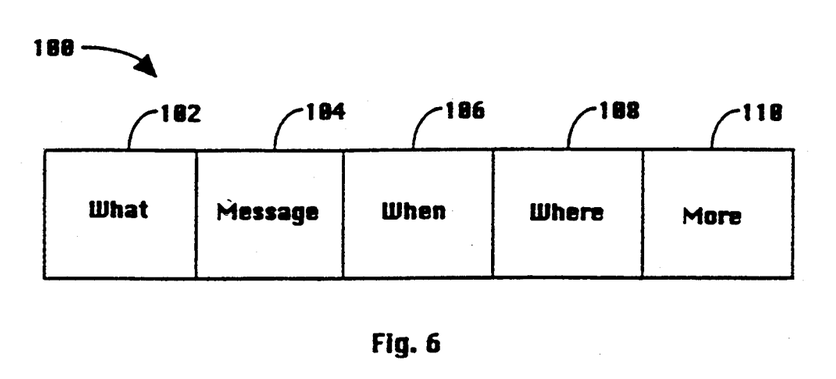
FIG. 6 is an illustration of an event record containing the required information for enabling a called function to determine, inter alia, whether an event is of interest to an event qualifier.

```
typedef struct KPoint
{
    short v;
    short h;
}
typedef struct K-EventRecord
{
    short    What;      /* type of event */
    long     Message;   /* dependent on event type */
    long     When:      /* time stamp */
    KPoint   Where;     /* pointing coordinates */
    void     More;      /* additional buffer (if any) for the
                           event */
}
K_EventRecord;
```

(See also the discussion of event record in the above-referenced INSIDE MACINTOSH, volume 1, page 1-249.) The What field 102 contains an event code identifying the type of event. Each system will have a predefined set of event types. For example, events on the Macintosh computer are identified as:

| | | |
|---|---|---|
| nullEvent | =0; | {null event} |
| mouseDown | =1; | {mouse-down} |
| mouseUp | =2; | {mouse-up} |
| keyDown | =3; | {key-down} |
| etc. | | |

(See, INSIDE MACINTOSH, Volume 1, page 1-249.)

Message field 104 will contain information that is a function of the type of event. The precise structure of the Message field is system dependent, but on the Macintosh computer it is a 32 bit structure, the contents of which are discussed in INSIDE MACINTOSH, volume 1, page I-250. One possible list of the contents for Message field 104 for a system according to one embodiment of the present invention is given in Table 5.

TABLE 5

| Event type | Contents of EventRecord.message |
|---|---|
| TOUCH_DOWN_EVNT | undefined |
| TOUCH_UP_EVNT | undefined |
| FIXBUT_DOWN_EVNT | bit 0–7:which button |
| FIXBUT_UP_EVNT | bit 0–7:which button |
| KEYBD_KEY_DOWN_EVNT | bit 0–7:character button; bit 8–15 key code |
| KEYBD_KEY_UP_EVENT | bit 0–7:character button; bit 8–15 key code |
| PLAY_KEY_DOWN_EVNT | undefined |
| PLAY_KEY_UP_EVNT | undefined |
| STOP_KEY_DOWN_EVNT | undefined |
| STOP_KEY_UP_EVNT | undefined |
| POWER_KEY_DOWN_EVNT | undefined |
| POWER_KEY_UP_EVNT | undefined |
| IR_TEXT_EVNT | bit 0–7:IR device code; bit 8–15:the text |
| IR_BUT_DOWN_EVNT | bit 0–7:IR device code; bit 8–15:which button |
| IR_BUT_UP_EVNT | bit 0–7:IR device code; bit 8–15:which button |

When field 106 may contain data about when (e.g., relative to the system clock) the event occurred. Where field 108 may contain data about where the cursor position was on the screen at the time of the event. Finally, More field 110 is an optional field which may be used to contain data relating to other states of the system at the time the event occurred. The data and use of the data contained in More field 110 is provided as a developer/user convenience. It may but need not be present, and there may be multiple More fields (not shown) as appropriate for a particular application.

Thus, the function may determine if the event is of the type in which the event qualifier is interested by comparing the value of the message field 104 with a predefined value representing the desired particular event type (e.g., a key-down of the letter "A"). The function of the other fields of data structure 100 will become apparent in the following discussion.

In a manner roughly equivalent to the registration of an event qualifier with the event manager (or intermediate event manager), each logic qualifier will register its interest in the outcome of a determination made by the function of an event qualifier or in the state of an aspect of the system returned by a state check qualifier. For example, returning to FIG. 3, logic qualifier 76 will register its interest in the event determinations of event qualifiers 72 and 74, this registration may be accomplished, for example, by passing the address of a function that is to be called, similar to the procedure described above. When a called function determines that an event it is interested in has occurred, that function calls the registered logic qualifier's function. In most circumstances there will only be one logic qualifier registered with an event qualifier, but the above mechanism may be employed to register multiple logic qualifiers in appropriate circumstances.

The functions of the logic qualifier called by the event qualifiers may be, for example, set flag functions. In the case of the example of FIG. 3, upon a determination that the "A" key has been depressed a first flag may be set. Likewise, upon determination that a mouse-down event has occurred, a second flag may be set. Referring once again to FIG. 6, part of the data structure 100 passed to an event qualifier upon occurrence of an event is the system time at which an event occurred, located in When field 106. Thus, each event qualifier is provided with a relative measure of when the event in which that qualifier is interested occurred. This information may then be used to determine if the events occurred proximate enough in time to be considered "simultaneous" in order to satisfy an "AND" logic qualifier. For example, the parameter passed to the event qualifier function may, in turn, be passed to the logic qualifier function.

Ultimately, the application must be notified of the occurrence of the events and states of aspects of the system. This may be accomplished in the manner described above. That is, the application has a registered interest in the logic qualifier such that if the logic qualifier is satisfied (i.e., its flags are set and, if important, the events occurred sufficiently proximate to one another in time), an application's function is called by the logic qualifier, and a parameter is passed for execution of that function. To complete the example of FIG. 3, if logic qualifier 76 is satisfied (i.e., the "A" key and the mouse button are depressed simultaneously) the application's function of selecting (or highlighting) all text could be invoked.

Since all checking for events is handled by the event qualification network, including determination of the logical relationship between events, an application need not poll the event manager itself for the occurrence of events, as is done in the prior art, but may idle, or perform other functions while waiting for the function call from the logic qualifier.

It will be appreciated that since the event record 100 passed by the event manager may contain data representing the time an event occurred, the position of the cursor at the time the event occurred, as well as other states of the system at the time the event occurred, great flexibility is provided in establishing the function invoked upon satisfaction of the logic qualifier. That is, the application may be provided significant data about the event and the state of the system when the event occurred which may be used by the application upon notification that the desired event(s) and conditions occurred.

It will also be appreciated that great flexibility is provided in defining events. That is, events are typically identified by number, and according to one embodiment of the present invention the event identification is a 16 bit number. Therefore, over 65,000 different events may be identified. Again, event definitions may be system-specific. Furthermore, "synthetic" events (i.e., events disconnected from the user) may be evaluated by the network, for example from files recording user sessions, by means of a journaling mechanism such as that disclosed in Inside Macintosh, Volume 1, pages I-261-62.

Additional details with regard to events and event handling are discussed in chapter 5 of the Consumer Operating System (COS) Engineering Requirements Specification (ERS), a copy of which is attached hereto as Appendix A, and incorporated herein by reference.

Figure 7:
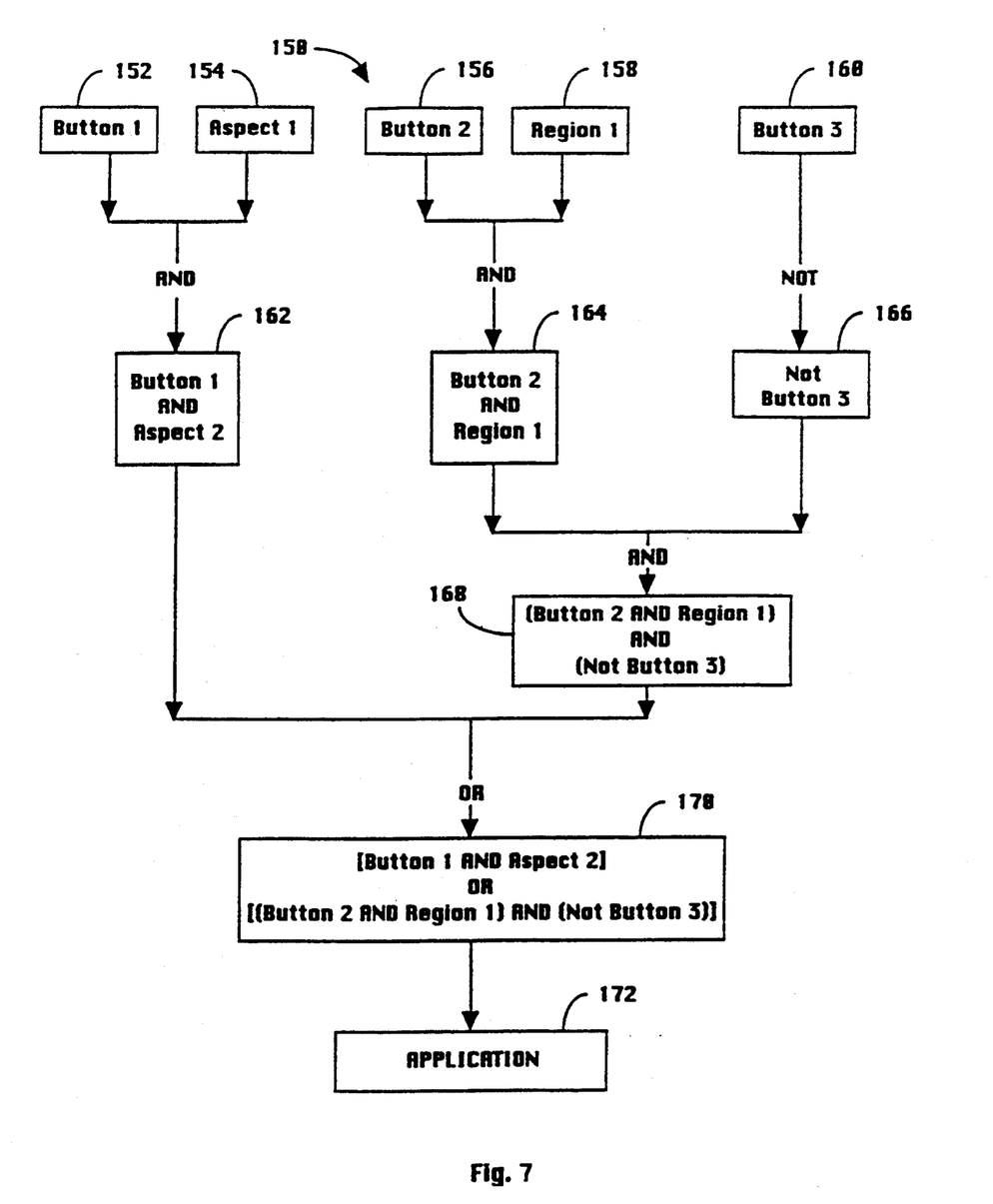
FIG. 7 is an illustration of another event qualification network according to an exemplary embodiment of the present invention.
Figure 8:
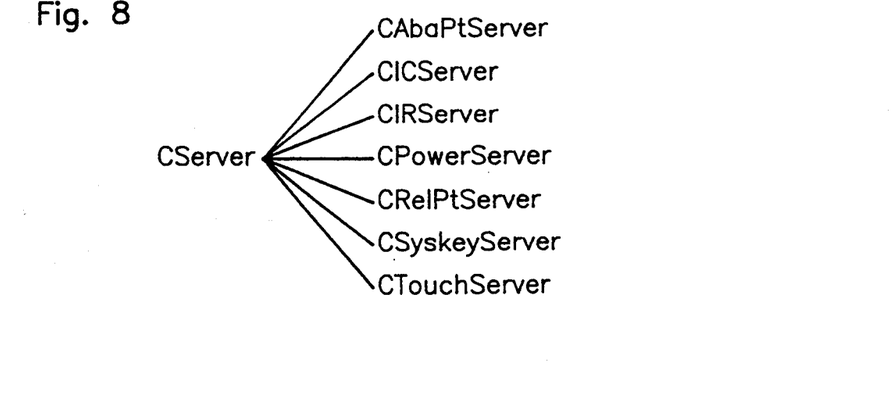
FIG. 8 is an illustration of the COS event server hierarchy according to one embodiment of the present invention, as described in Appendix A hereof.
Figure 9:
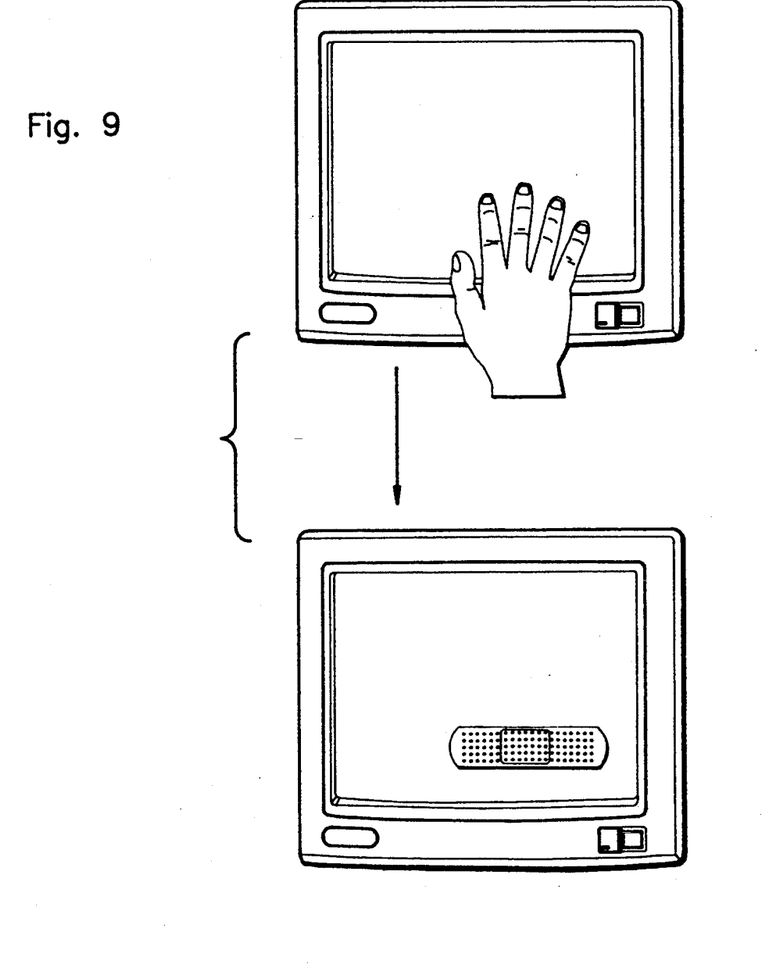
FIG. 9 is an illustration of an interaction between user and computer demonstrating the metaphor of a "hurt" screen, and its response of covering the hurt region with a "bandaid," as described in Appendix A hereof.
Figure 10:
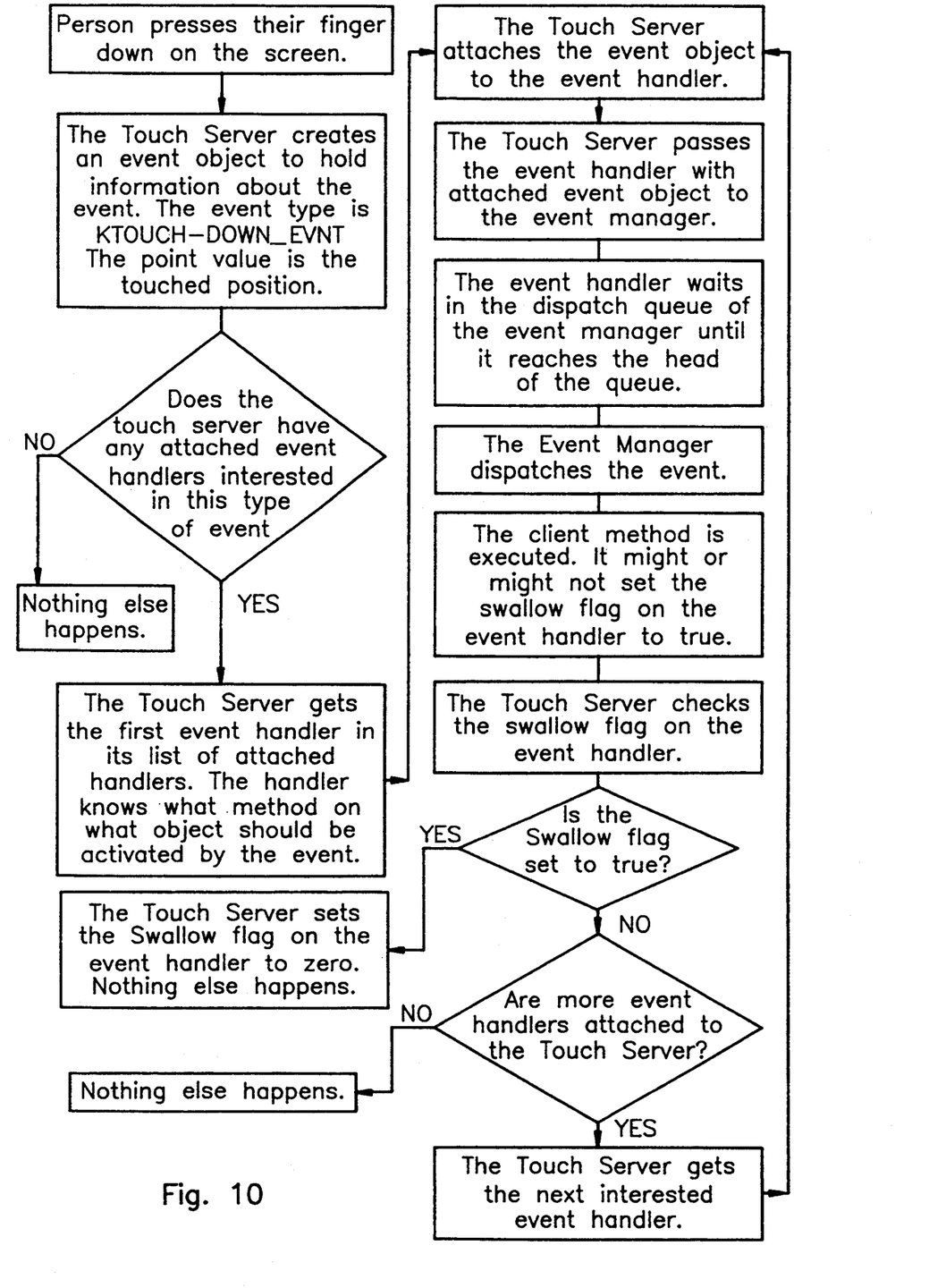
FIG. 10 is a flow diagram for an event referred to as KTOUCH_DOWN_EVNT, also as described in Appendix A hereof.

FIG. 7 illustrates another exemplary event qualifier network 150, slightly more complex than that illustrated in FIG. 3. In this example, the event qualifier network 150 may be built into a consumer game device, which includes a remote control pointing and selecting device for interacting with a game displayed on a monitor. Buttons from the remote control device generate events, for example by causing an infra red signal to be emitted by the remote control device which is detected by a base unit containing the operating system and application program. Network 150 is also capable of checking for the position of a pointing object controlled by the remote control and displayed on the screen. Finally, network 150 is capable of checking for the state of certain aspects of the system. Each of these checks is handled by an event qualifier and/or state check qualifier as follows.

Event qualifier 152 qualifies the button-down event for a button 1 on the remote control device. State check qualifier 154 qualifies the state of an aspect 1 of the system (for example, whether a user-selectable feature is enabled). Logic qualifier 162 is registered with qualifiers 152 and 154, and invokes an action when button 1 is depressed and aspect 1 is in the predetermined state. Likewise, event qualifier 156 qualifies the button-down event for a button 2 on the remote control device. Event qualifier 158 qualifies whether the pointing device is in a particular predefined region of the screen, for example over a target, in a corner, etc. Again, Logic qualifier 164 invokes an action when button 2 is depressed and the pointer is in the predefined region on the screen. Finally, event qualifier 160 qualifies the button-down event for a button 3 on the remote control device. Logic qualifier 166 is registered with event qualifier 160 such that it invokes an action only in the absence of a button-down event for button 3. Logic qualifier 168 qualifies two other logic qualifiers, 164 and 166. It is an AND logic qualifier such that it invokes an action if button 2 is depressed while the cursor is in region 1 of the display AND while button 3 is not depressed. Logic qualifier 170 is an OR qualifier. It qualifies logic qualifiers 162 and 168 such that it calls a function of the application 172 if button 1 is depressed AND aspect 2 is in a predefined state OR if button 2 is depressed while the cursor is in region 1 of the display AND button 3 is not depressed. Arbitrarily complex logical networks may be built in a similar fashion for the specific needs of the application programmer.

In general, to those skilled in the art to which this invention relates, many changes in construction and widely differing embodiments and applications of the present invention will suggest themselves without departing from its spirit and scope. For example, qualifiers may be created in a graphical user interface environment, in a programming language environment, imported from other applications, etc. Furthermore, event qualification networks may be masked in appropriate circumstances to allow portions of a network to monitor events while segregating other portions from events. Thus, the disclosures and descriptions herein are illustrative, and are not intended and should not be read to be in any sense limiting.

What is claimed is:

1. A method for determining, on behalf of an application program, when a specified combination of logically related events has occurred, said method comprising the following steps:
providing an event qualifier network ("EQN"), the EQN specifying a logical relationship among the combination of events, the logical relationship comprising a plurality of logical qualifiers, each one of said logical qualifiers qualifying a group of one or more of the events, and wherein at least two of the logical qualifiers correspond to different logic functions;
registering an interest, on behalf of the application program, in being notified when the logical relationship specified by the EQN has been satisfied;
detecting the occurrence of each of the events;
notifying the EQN of each said occurrence;
determining when the logical relationship among the combination of events specified by the EQN is satisfied; and
notifying the application program when the specified logical relationship among the combination of events has been satisfied.

2. The method of claim 1, wherein the logical qualifiers correspond to logic functions selected from the group comprising logical AND, logical OR, and logical NOT.

3. The method of claim 1, wherein the logical relationship specified by the EQN among the combination of events further comprises a qualifying condition corresponding to a proximity in time between two or more of the events.

4. The method of claim 1, wherein the logical relationship specified by the EQN among the combination of events further comprises a qualifying condition corresponding to a sequence in which two or more of the events occur.

5. The method of claim 1, wherein the logical relationship specified by the EQN among the combination of events further comprises a qualifying condition corresponding to a location at which one or more of the events occurs.

6. The method of claim 1, further comprising the steps of registering an interest with an event manager on behalf of the EQN in being notified when each event occurs.

7. The method of claim 1, wherein the step of detecting the occurrence of each event, the step of notifying the EQN of each occurrence, and the step of determining when the logical relationship among the combination of events is satisfied, are all performed without the dedication of any application program execution time.

8. The method of claim 1, wherein the method is performed using a computer system, and wherein the logical relationship specified by the EQN among the combination of events further comprises a logical relation between one or more of the events and a qualifying condition corresponding to the computer system being in a specified state.

9. An apparatus for determining, on behalf of an application program, when a specified combination of logically related events has occurred, said apparatus comprising:
an event qualifier network ("EQN") specifying a logical relationship among the combination of events, the logical relationship comprising a plurality of logical qualifiers, each one of said logical qualifiers qualifying a group of one or more of the events, and wherein at least two of the logical qualifiers correspond to different logic functions;

means for registering an interest with the EQN, on behalf of the application program, in being notified when the logical relationship specified by the EQN has been satisfied;

event manager means for detecting the occurrence of each of the events, and for notifying the EQN of each said occurrence;

means for determining when the logical relationship among the combination of events specified by the EQN is satisfied; and means for notifying the application program when the specified logical relationship among the combination of events has been satisfied.

10. The apparatus of claim 8, wherein the logical qualifiers correspond to logic functions selected from the group comprising logical AND, logical OR, and logical NOT.

11. The apparatus of claim 8, wherein the logical relationship specified by the EQN among the combination of events further comprises a qualifying condition corresponding to a proximity in time between two or more of the events.

12. The apparatus of claim 8, wherein the logical relationship specified by the EQN among the combination of events further comprises a qualifying condition corresponding to a sequence in which two or more of the events occur.

13. The apparatus of claim 8, wherein the logical relationship specified by the EQN among the combination of events further comprises a qualifying condition corresponding to a location at which one or more of the events occurs.

14. The apparatus of claim 8, wherein the means for detecting the occurrence of each event, the means for notifying the EQN of each occurrence, and the means for determining when the logical relationship among the combination of events is satisfied, all operate without the dedication of any application program execution time.

* * * * *

UNITED STATES PATENT AND TRADEMARK OFFICE
CERTIFICATE OF CORRECTION

PATENT NO. : 5,430,875

DATED : July 4, 1995

INVENTOR(S) : Yin-Shur D. Ma

It is certified that error appears in the above-indentified patent and that said Letters Patent is hereby corrected as shown below:

```
    Column 1, line 67, replace "indepedently" with
-- independently --.
    Column 2, line 28, replace "1-243" with -- I-243 -- and
"1-266" with -- I-266 --.
    Column 5, line 47, replace "Ellis." with -- Ellis, --.
    Column 5, line 59, replace "Button-Qualifier" with
-- ButtonQualifier --.
    Column 5, line 60, replace "class." with -- class, --.
    Column 6, line 15, replace "state." with -- state? --.
    Column 7, line 67, replace "True of False" with
-- True or False --.
    Column 10, line 57, replace "When:" with -- When; --.
    Column 10, line 65, replace "1-249" with -- I-249 --.
    Column 11, line 8, replace "1-249" with -- I-249 --.
    Column 11, line 40, replace "1()8" with -- 108 --.
    Column 11, line 64, replace "74, this" with -- 74. This --.
    Column 15, line 16, replace "claim 8" with -- claim 9 --.
```

UNITED STATES PATENT AND TRADEMARK OFFICE
CERTIFICATE OF CORRECTION

PATENT NO. : 5,430,875
DATED : July 4, 1995
INVENTOR(S) : Yin-Shur D. Ma

It is certified that error appears in the above-indentified patent and that said Letters Patent is hereby corrected as shown below:

```
Column 15, line 20, replace "claim 8" with -- claim 9 --.
Column 16, line 4, replace "claim 8" with -- claim 9 --.
Column 16, line 9, replace "claim 8" with -- claim 9 --.
Column 16, line 14, replace "claim 8" with -- claim 9 --.
```

Signed and Sealed this

Seventh Day of May, 1996

Attest:

BRUCE LEHMAN

*Attesting Officer*  *Commissioner of Patents and Trademarks*